United States Patent [19]

Nagasaka et al.

[11] Patent Number: 4,901,666
[45] Date of Patent: Feb. 20, 1990

[54] ELECTROSTATIC POWDER COATING DEVICE

[75] Inventors: Hideo Nagasaka, Hitachi; Nobuo Furuya, Yokohama; Mitsuyoshi Kumada, Yachiyo, all of Japan

[73] Assignee: Onoda Cement Company, Ltd., Yamaguchi, Japan

[21] Appl. No.: 288,030

[22] Filed: Dec. 21, 1988

[30] Foreign Application Priority Data

Jun. 24, 1987 [JP] Japan .................................... 156928

[51] Int. Cl.$^4$ ............................................... B05B 5/02
[52] U.S. Cl. ...................................... 118/634; 118/70; 118/100; 118/326; 118/DIG. 7
[58] Field of Search ..................... 98/115.2, 634, 326, 98/631, 621, DIG. 7, 630, 70, 100

[56] References Cited

U.S. PATENT DOCUMENTS

| | | | |
|---|---|---|---|
| 2,723,921 | 11/1955 | Starkey | 118/630 |
| 3,902,455 | 9/1975 | Lehmann et al. | 118/630 |
| 3,918,641 | 11/1975 | Lehmann et al. | 118/621 |
| 4,587,924 | 5/1986 | Reinlein et al. | 118/630 |

Primary Examiner—Bernard Nozick
Attorney, Agent, or Firm—Price, Heneveld, Cooper, DeWitt & Litton

[57] ABSTRACT

A cover for forming a space for coating is provided above an electroconductive belt conveyor for adjusting an electric field at an end portion of a flat plate-like object to be coated, electrostatic powder coating guns pointed at the object to be coated on the belt conveyor in the space for coating are provided, and means for introducing air into the space for coating and means for exhausting the air are respectively provided. As a result, the strength of the electric field formed from the electrostatic powder coating guns to the electroconductive belt conveyor and the object to be coated is made uniform through their entire surface so that the thickness of a powder layer to be adhered to the object to be coated is made uniform from its central portion to an end portion. Consequently, the waste of the powder coating material is prevented, and local cracks in a portion having a great thickness generated when the coated object is bent are prevented.

24 Claims, 5 Drawing Sheets

69

69

ELECTROSTATIC POWDER COATING DEVICE

BACKGROUND OF THE INVENTION

The present invention relates to an improvement in exclusive coating devices used in the main for electrostatic powder coating one side of a flat object to be coated. Furthermore, the present invention relates to exclusive coating devices, that is, for coating one side only, arranged so that the bottom surface of a space in which the powder coating is performed comprises an electroconductive belt conveyer which also serves as a conveying device for objects to be coated and which is designed to be utilized in recovering oversprayed powder. Therefore, this exclusive coating device is made capable of performing at high speed, electrostatic powder coating in which the use of coating materials can be significantly more economical and a particularly uniform distribution of the coated film can be obtained. Also, the coating materials can be effectively applied to the end portions of the object to be coated, and color change can also be as completed in a significantly shorter time.

An electrostatic powder coating exhibits significantly advantageous characteristics from the viewpoints of excellent quality of the coated film, prevention of pollution, and saving of energy. Therefore, the importance of electrostatic powder coating has been further recognized recently.

In conventional electorstatic powder coating, the coating process is executed in such a manner that a material, having a surface which has not been coated and has been formed substantially to the same shape as that of the final product after the assembly work on the material has been completed, is subjected to coating by spraying a coating powder on it using an electrostatic coating powder gun while being hung from a hanger conveyer so as to be passed through a coating booth. Next, the thus-coated material is subjected to a baking process, and thus its coating process is completed.

However, such electrostatic powder coating suffers from two problems in that the coating materials are, in general, expensive, and an excessive length of time is required to change the coating color in the coating booth and the recovery device. As a result, a wide distribution of the electrostatic coating is prevented. The problem of cost of the coating material can be, in principle, satisfactory overcome by making the coated film thin. However, since in practice the materials to be coated have complicated shapes, the thickness of the coating on the projecting portion becomes too great when a predetermined coating thickness is realized due to Faradicage effect. This is a critical defect involved in powder coating. Consequently, the average coating thickness on the actual object to be coated becomes excessively greater than the thickness needed to be applied for achieving the principle object of the coating, such as shielding and rust prevention. As a solution for this problem, in the outer casing of home electric products, such as refrigerators, electric washing machines, coolers, which are manufactured by subjecting a steel plate to bending, the powder coating is arranged to be performed when the material is only in the stage of a punched out flat material before being subjected to a major bending operation. The latter working such as bending and so forth are then performed. As a result of such a method, a thin film coating exhibiting an excellent uniformity having the thickness needed in principle can be performed without any affection of the above-described Faradicage effect. As a result of this, a powder coating can be performed which is competitively satisfactory with respect to liquid coating from the viewpoint of cost of coating. In addition, the following advantages can be obtained with such a coating method: the number of times the powder coating has to be needs to be performed only once, and an excellent quality coating can be formed on the cut edge of the material. Furthermore, the quality of the appearance of the coating is suitable for home electric appliances.

The powder coating for achieving the above-described objects is classified in two ways:

A case in which only one side of the flat object needs to be subjected to the coating, while the hidden side needs to be free as much as possible from the presence of the coated film, and the cut edge of the object needs to be sufficiently coated;

another case in which a predetermined width of 5 mm to 10 mm from the cut edge of the flat object to be coated is needed to be formed on the hidden side. Furthermore, in many cases, the other regions need to be free from the coated film. In particular, the following fact is critical for performing the bending work after the coated film has been formed: that the thickness of the coated film on the cut edges and regions adjacent to the end portions is the same thickness as that of the central portion of the object to be coated. In particular, it is critical that at least the thickness of the region adjacent to the cut edges of the flat plate is not excessive with respect to that of the central portion. That is, on flat plates which have been subjected to the usual electrostatic powder coating tend to become thicker in the region in the vicinity of the cut edges thereof. Therefore, when bending work is intended to be performed along a bending line included in the surface of the flat plate, the coated film in the thickly coated portions at the two ends can generate cracks. Furthermore, the above-described powder coating critically needs to be arranged in such a manner that a change of coating color in the coating device can be completed in a short time. The usual and conventional widely distributed electrostatic powder coating equipment in which objects to be coated are hung from a hanger conveyer and the thus-hung objects are subjected to coating cannot satisfy the above-described required conditions because of the following reasons:

That is, FIG. 10 illustrates the horizontal cross-sectional shape of a flat plate object to be coated which has been manufactured by punching and subjected to an electrostatic powder coating by use of a usual powder coating device. A flat plate object 71 to be coated disposed perpendicularly to the surface of the drawing sheet is subjected to the powder coating by an electrostatic powder coating gun 77 with the same being moved in the direction designated by the arrow 80 in a coating space surrounded by booth side walls 78 and 79. The thickness of the powder layer which has been thus-formed on the object to be coated is schematically shown in this drawing. As can be clearly seen from this drawing, a powder layer 72 of uniform thickness is formed in the central portion of the object 71 to be coated. However, thick powder layers 73 and 74 are formed adjacent to the gun 77 and at both ends of the object 71 to be coated in the direction of the movement of the conveyer. The thickness of these thick powder layers 73 and 74 is greater than that of the powder layer 72 formed at the central portion of the object 71 to be coated by 25 to 40%. Furthermore, other thick layers 75 and 76 are formed on the object 71 to be coated on the side opposite from the gun 77. The width of these layers in general reaches several tens of millimeters. The electrostatic powder coating process of which the present invention is the subject is arranged in such a manner that when the required products are manufactured by forming a coated film on the flat plates 71 with a bending or assembly work being performed subsequently electrostatic powder coating process needs to have the uniformity of the coated film confined within a range of ±10%, or if conditions permit, ±20%. Therefore, the powder coating performed by the conventional electrostatic powder coating device shown in FIG. 10 cannot satisfy the above-described requirements. The reason for this lies in that the electric lines of force are concentrated in the end portions of the object to be coated 71, causing the electric field to be concentrated. As a result, a large quantity of powder is necessarily applied to this portion and the thickness of the end portions becomes excessively greater than that of the central portion.

An object of the present invention is to prevent a rise in the total cost of the powder coating material required in by electrostatic powder coating applied to a flat objective to be coated, this object being intended to be achieved by preventing an increase in the thickness of the powder coating layer at the end portions of the object to be coated with respect to that at the central portion of the same so that the quantity of the powder coating material used is limited.

Another object of the present invention is to prevent generation of cracks in a thickly coated portion at the end portions of the object to be coated when the flat plate object to be coated is bent during forming with the coated film thereon.

A further object of the present invention is to complete a color change in the coating device for performing the electrostatic powder coating in a short time.

SUMMARY OF THE INVENTION

An electrostatic powder coating device according to the present invention comprises:

an electroconductive belt conveyer for conveying an object to be coated and for adjusting an electric field of an end portion of the object to be coated;

a cover for forming a space for coating above the belt conveyer;

electrostatic powder coating guns pointed at the object to be coated in the space for coating;

means for introducing air into the space for coating;

means for exhausting air from the space for coating; and means for removing the powder coating material adhered to the belt conveyer.

The above-described objects and the structure which can be most suitable for these objects will be further understood from the hereinafter described description for the accompanied drawings

BRIEF DESCRIPTION OF THE DRAWINGS

FIGS. 5 and 6 each illustrates an embodiment of the present invention, wherein

FIG. 5 is a cross-sectional view taken along a line A—A in FIG. 6; and

FIG. 6 is a cross-sectional view taken along a line B—B in FIG. 5; and

DESCRIPTION OF THE PREFERRED EMBODIMENT

Figure 1:
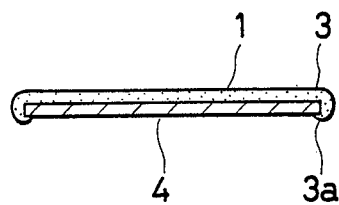
FIGS. 1 and 2 are vertical cross-sectional views of each of a coated materials obtained by a powder coating device according to the present invention.
Figure 2:
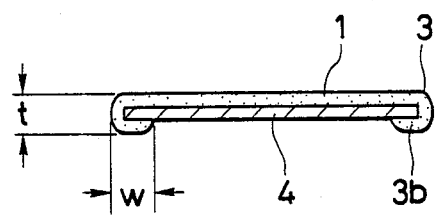
Figure 3:
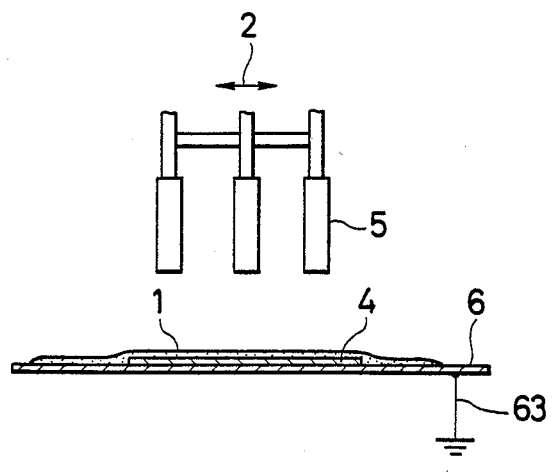
FIGS. 3 and 4 are vertical cross sectional views illustrating the principles of the coating according to present invention, respectively.
Figure 10:
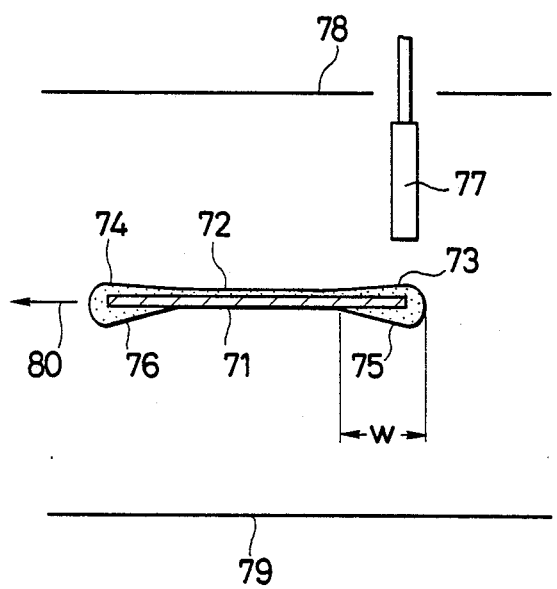
FIG. 10 is a horizontal cross-sectional view illustrating a coating resulting from using a conventional device.

Referring to FIG. 3 in which the principle of electrostatic powder coating according to the present invention is shown, a thin flat plate-like object 4 to be coated is maintained substantially horizontally. The object 4 to be coated is put on and in substantial contact with a flat conductor 6 for regulating an electric field grounded via a conducting wire 63 and having a larger area than the object 4 to be coated. Therefore, the object 4 to be coated is subjected to a coating with a series electrostatic powder coating guns 5 disposed above the former with the object 4 moved in a direction perpendicular to the surface of the accompanied drawing sheet and vibrated parallel to the surface of the accompanied drawing sheet in the direction as designated by an arrow 2. When coating is performed in such a manner, electric force lines starting from the electrostatic powder coating guns 5 are distributed uniformly on and terminated at a flat plate-like conductor 6 disposed together with the object 4 to be coated and behind this object 4. Therefore, the powder layer 3 and in, particular, the hidden side powder layer 3a (FIG. 1) at the end portion of the surface of the object 4 to be coated does not become thicker with respect to the phenomenon shown in FIG. 1. Therefore, a powder layer 1 having a continuous uniform thickness over the portion above the flat plate like conductor 4 can be formed. By spacing the object 4 to be coated from the flat plate-like conductor, the problems as shown in FIG. 10 and suffered with conventional powder coating upon a thin plate-like object can be significantly and easily overcome, the problem being such that the thickness of the coated film becomes excessively thicker at the end portions of the object 4 to be coated. Simultaneously, by recovering the overspray powder remaining on the flat plate-like conductor 6 after the object 4 to be coated has been removed, an economically excellent rate of use of the coating material can be obtained. The powder coating device as shown in FIG. 3 incorporating the present invention is preferred in the case as shown in FIG. 1 in which the hidden side of the object 4 to be coated needs to be free from a formed coating film. On the other hand, FIG. 4 illustrates the principle structure of a device according to the present invention which is preferably used in a case where, as shown in FIG. 2, it is necessary that the powder layer 3b having a predetermined width w is formed on the hidden side of the end portions of the object 4 to be coated.

Figure 4:
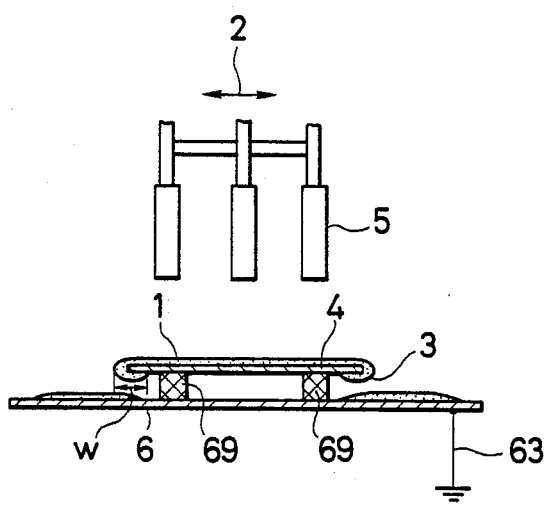

That is, referring to FIG. 4, the object 4 to be coated is put on the flat plate-like conductor grounded via the conductor wire 63 in such a manner that a predetermined spacing is provided by use of a spacer 69 formed by a electroconductive material. Although the operation of the object to be coated and the guns are the same as those shown in FIG. 3, the concentration of the electric fields at the end portions of the object 4 to be coated can be properly absorbed by the flat-plate like electric conductor 6 by virtue of the above-described structure. Furthermore, a coating film extending to the hidden side of the object 4 can be formed with the thus-formed coating film having a predetermined width w which is, as shown with reference numeral 3 in the drawing, defined by the size of the spacers 69. Since the width of the coating film 3 to be formed on the hidden side can be changed as needed by the size of the spacer 69, this width can be set to a desired value by changing the spacer.

As shown in FIGS. 3 and 4, the objective of forming a uniform thickness power layer coating on one side of a flat plate-like object 4 can be achieved by providing a flat plate-like conductor 6 for adjusting the electric field and having a size larger than that of the object 4 to be coated on the hidden side of the object 4 to be coated in a closely disposed or close-contact manner. The present invention is achieved by means of this knowledge.

Figure 5:
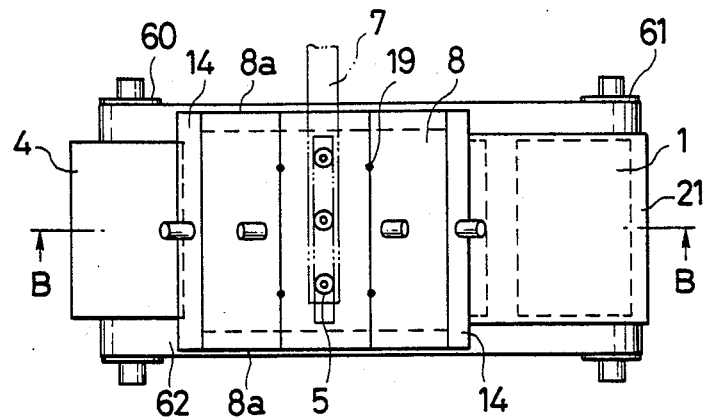
Figure 6:
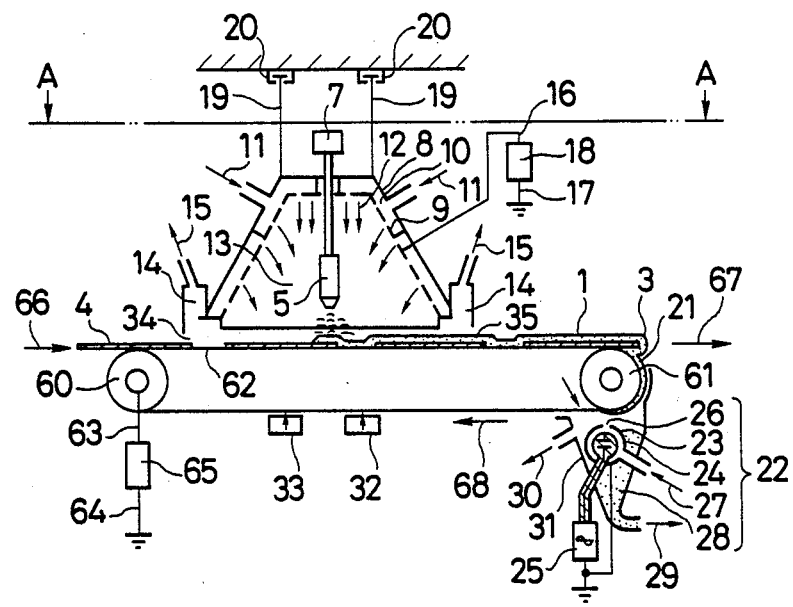

In an embodiment shown in FIGS. 5 and 6, a space 13 for coating has a bottom thereof constituted by an electroconductive conveyer belt 62 having a width wider than that of the object 4 to be coated which is, if necessary via an electric power source 65, grounded by using an electroconductive wire 64. On the other hand, the upper portion of the same is surrounded by a cover 8 and side walls 8a. The object 4 to be coated is laid flat on the belt of a belt conveyer 62 driven by the pulleys 60 and 61 in the direction designated by an arrow 68. Then, the object 4 to be coated 4 passes through the inlet port 34 disposed in the cover 8, and is introduced into the space 13 for coating. In the space 13 the object 4 to which the coating is to be applied by an electrostatic powder coating gun 5 which is supported within the booth from the ceiling of the cover and is passed through the opening area for coating. Next, the object 4 to be coated is discharged outside the system through an outlet port 35 disposed in the cover 8, and is transported to a baking device (omitted from illustration). As described above, the coating process is thus completed. In addition, the electrostatic powder coating gun 5 is reciprocated, as needed, by a reciprocator 7 for the purpose of making the thickness of the coated film uniform.

In the embodiment shown in FIGS. 5 and 6, the cover 8 surrounding the space 13 for coating is arranged as a double layered structure having, as illustrated, a space 10 therebetween. Furthermore, the cover 8 is provided with an inside cover 9 made of a porous insulating material on the inside thereof. As a result, introduced air designated by an arrow 11 is injected as designated by an arrow 12 from the inside cover 9 to the space 13 for coating, and the air is rectified so as to become a downward air flow, and is lowered slowly toward the electroconductive conveyer belt 62 so that the gun system is kept clean. In this case, since the inside cover 9 is made of an insulating material, monopolar ions present at the front end portion of the electrostatic powder coating gun 5 are accumulated on the surface of the inside cover inside 9 in a short time after starting the operation. Therefore, the electric potential at the inside cover 9 can be raised to the same level as that of the electrostatic powder coating gun 5. As a result, the charged powder jetting from the front end of the electrostatic powder coating gun 5 is rejected by the inside cover 9. Therefore, with the assistance of the operation of the air flow jets, as designated by an arrow 12, from the inside cover 9, the charged powder does not contaminate the inside cover 9, and substantially all of the charged powder is moved toward the grounded and electroconductive conveyer belt 62, whereon the electrostatic coating is performed. Therefore, a significant coating efficiency can be obtained. Furthermore, the air introduced toward the space 13 for coating is, as designated by an arrow 15, exhausted by air exhausting means 14 disposed adjacent to the electroconductive conveyer belt 62.

In this arrangement, the electric power source 65 is used in the case of a small sized device in which it is convenient to give the conveyer belt 62 a predetermined voltage, while the same is not usually used and the conveyer belt is merely grounded in the case of a large sized device. Furthermore, in the case where the adhesion of the coating powder to the inside cover 9 is intended to be completely prevented by adjusting the distribution of the electric fields in the space 13 for coating, the structure may be constructed in such a manner that the cover inside 9 is made of a permeable semiconductor and the same is grounded by using of electroconductive wires 16 and 17 via an electric power source 18.

As described above, the electrostatic powder coated layer 1 is in the main formed on the object to be coated and is also in part formed on the belt in the portion adjacent to the outlet port of the electroconductive conveyer belt 62 when the operation is started. As described, in principle, in the article "Means for Overcoming Problems", an end powder coating layer 3 which is assuredly covered for preventing the formation of a layer of excessive thickness is formed at the end portion of the object 4 to be coated. Then, the coated object 4 is separated from the belt conveyer to be introduced into the ensuing process (omitted from illustration). Furthermore, the overspray powder coating material 21 adhered to the electroconductive conveyer belt and conveyed to the lower portion of the belt when the pulley 61 is rotated is, as a whole, recovered by powder coating material removal means represented by reference numeral 22. The thus-recovered overspray powder coating material 21 becomes, as designated by an arrow 29, a recovered powder coating material for the purpose of reuse as needed. This powder coating material removing means 22 performs a major element of the present invention, and as shown in detail in FIG. 6, powder coating material removing means comprising an ion shower electricity erasing device is an practical means. Although, in a case where a thermoplastic and non-adhesion type coating powder such as Teflon, Nylon and polyethylene, a suction type removing device or scraping type removing device can be used. However, the powder coating material removing means 22 comprising the ion shower type electrical erasing device is the most suitable on a viewpoint of a practical use. A powder coating material removing container 31 having the same width as that of the electroconductive conveyer belt 62 is, as shown in FIG. 6, disposed perpendicular to the surface of the accompanying drawing sheet in such a manner that it surrounds the belt pulley 61. A cylindrical ion shower duct 24 is accommodated in the powder coating material removing case 31 so as to be, similar to the powder coating material removing case 31, the same width as that of the electroconductive conveyer belt. The upper portion of the cylindrical ion shower duct 24 is provided with a series of ion shower jetting apertures 26 disposed adjacent to the electroconductive conveyer belt 62 and having several to ten and several millimeter intervals therebetween. Air supply streams can be, as designated by an arrow 27, jetted through these jetting apertures 27. A series of corona discharge electrodes 23 are disposed inside the ion shower jetting apertures 26 at the same pitch as that of the corresponding shower jetting apertures 26. An AC voltage is supplied to these corona discharge electrodes 23 from an AC power source 25 so that AC corona discharges are generated between these corona discharge electrodes 23 and the ion shower jetting apertures 26. As a result, the air supply designated by the arrow 27 alternately includes positive and negative ions when the jetting at the ion shower jetting apertures is performed. As a result of this operation, overspray powder coating material 21 on the belt can be sufficiently electrically neutralized, and is thereby completely separated from the belt. Therefore, the adhesion of the belt overspray powder coating material 21 due to static electricity ceases, and, as designated by an arrow 28, the powder coating material, having lost its electrical charge, is recovered as designated by an arrow 29. An arrow 30 represents an exhaust for the treating air which was introduced, as designated by the arrow 27, into the powder coating material removing means case 31. By virtue of this exhaust 30, the recovered powder coating material designated by the arrow 29 is recovered with substantially free of air accompanying by the air in the case. Therefore, the size of the separation device for the recovered powder coating material 28 can be significantly limited, and furthermore, the coating color change in the recovery system can be completed in an extremely short time. Furthermore, powder coating material removal means using the method described in detail above, makes possible obtaining a very practical advantage, i.e. accumulation of small coating of powder materials on the surface of the electroconductive conveyer belt 62 which would cause a defective contact failure can be prevented and cleaning of the belt conveyers is substantially unnecessary at the time the color of the coating material is changed. If such structure is not sufficient to satisfactory clean the belt of overspray powder coating, the simultaneous use of belt washing means 32 and belt drying means 33 can effect a color change in which the cleaning is completely needless. However, such simultaneous employment is, in usual, needless. In the embodiment shown in FIGS. 5 and 6, the relative relationship between the object to be coated and the electrostatic powder coating gun becomes substantially the same as that of the electrostatic powder coating gun 5 performing in a limitless plane coating of the object 4 with the belt 62 having the same potential as that of the object 4 to be coated and being substantially grounded due to the electroconductivity thereof. On the other hand, since the air in the space for coating is defined by the air flow designated by the arrow 12 and jetted slowly from the inside of the cover to the belt and the insulating material, at least 90% of the quantity of the discharged powder, and usually a quantity of 95% or more can be applied to the object to be coated and to the belt in association with the electric field formed between the inside cover 9 and the object to be coated and the conveyer belt. Therefore, the overspray included in the exhaust designated by the arrow 15 can be limited to an extremely low level. Therefore, in many cases, the recovery and reuse of the power coating material does not need to be performed. This significantly contributes to simplify the color change in the electrostatic powder coating device.

In the electrostatic powder coating device according to the present invention, since the inside of the booth cannot be contaminated due to the operation as in detail described above, this inside can be cleaned in a short time. The inside cover 9 can be smoothly and quickly cleaned by hanging the whole body of the cover 8 from a hanger 19 of a moving device 20 disposed perpendicular to the conveyer belt and by separating the conveyer and the cover at the time of the color change. Another method of making the color change can be used in which the used cover is replaced by a previously cleaned cover. This method can realize a further reduction in the time required for the color change.

In the above-described embodiments, the employed electroconductive conveyer belt 62 comprises a belt without any permeability. However, the scope of the present invention is not limited to this description. For example, permeable material, such as metal net, punched porous plate or the like can be used for the conveyer belt if these materials have a means of adjusting the electric field at the end portion of the object to be coated. In this case, the exhaust from the space for coating may be performed through the conveyer belt.

Figure 7:
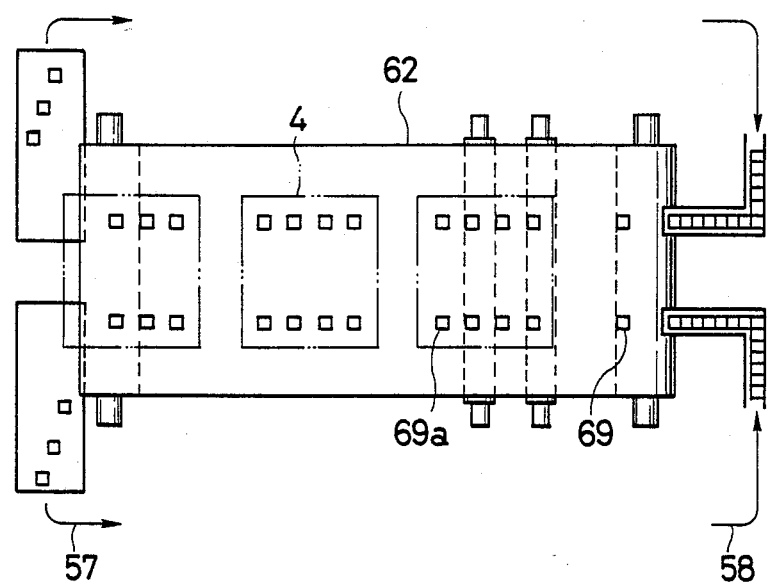
FIG. 7 is a plan view of an embodiment in which an further device is added to the device shown in FIG. 6.
Figure 8:
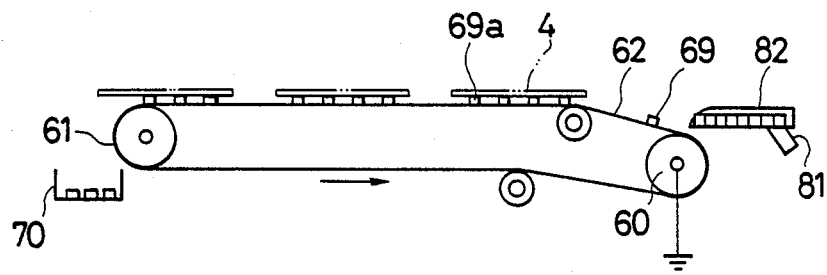
FIG. 8 is a side elevational view of the device illustrated in FIG. 7.
Figure 9A:
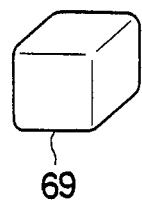
FIGS. 9A and 9B are enlarged cross-sectional views each illustrating the portions shown in the corresponding FIGS. 7 and 8.
Figure 9B:
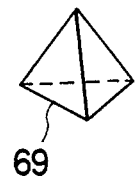

FIGS. 7, 8 and 9 illustrate a specific structure for performing the electrostatic powder coating the principle of which is shown in FIG. 4 and arranged for the purpose of adjusting width w and thickness t of the coated film which reaches the hidden side of the object 4 to be coated as shown in FIG. 2. The method of using the spacer 69 may be practically constituted by a projection on the belt. However, this method takes a long time to change the belt or the projection secured to the belt when the thickness of the spacer 69 needs to be changed for the purpose of adjusting the width w of the coated film 3b which reaches the hidden side of the object to be coated depending upon the design of the object to be coated. Furthermore, the operation of the powder coating material removing means 22 can be disturbed. Therefore, an embodiment capable of and also overcoming the above-described problems is illustarated in FIGS. 7, 8 and 9. FIG. 7 is a plan view illustrating only the belt, object to be coated and spacers which are being used, and from which the cover and the gun described in this embodiment are omitted. FIG. 8 is a side elevational view of the same, and FIGS. 9A and 9B illustrate two types of the spacer 69. As can be clearly seen from FIGS. 7 and 8, the spacers 69 are previously disposed on the belt in synchronization with the object 4 to be coated by a spacer feeder 82 which is driven by a vibrator 81, and the object 4 to be coated is put on the spacer 69 so as to locate the spacers 69 as illustrated by reference numeral 69a. When the object 4 to be coated reaches the driving pulley 61 after coating has been completed, the object 4 to be coated is removed by a conveyer (omitted from illustration), and the spacers 69 are dropped on a spacers recovering machine 70 so that the spacers 69 are returned to the spacers feeder 82 as designated by arrows 57 and 58, and is used again. The space between these arrows 57 and 58 is sometimes preferably provided with a spacer cleaner (omitted from illustration) for the purpose of always providing clean recycled spacers. The shape of such spacers may be selected needed, such shape being exemplified by a regular hexahedron whose corners are rounded or a regular tetrahedron as shown in FIGS. 9A and 9B. The only requirement is that the space to be formed by the spacer 69 will always and positively create a predetermined spacing regardless of the way it is oriented, and it needs to be a small member made of an electroconductive material. When the space is to be changed, another sized spacer may be used. Therefore, this is a significant convenience when different spaces are needed depending upon the type of the object to be coated. In particular, in a case where a object to be coated having a specially narrow width and a shape in which the peripheral portion thereof is bent downwards and is to be coated, a space can be assuredly and well formed by using a proper spacer 69 with respect to the object to be coated. Therefore, the control of formation of the coated film on the hidden side of the object to be coated can be very easily performed.

The means for adjusting the electric field in the vicinity of the end portion of the object to be coated and also the means conveying the object to be coated are not limited to that which is disposed horizontally as described in the embodiments of the present invention. Various modifications can be employed on the basis of the present invention. For example: the shaft of the belt pulley may be disposed vertically or in a slanted manner, and the object to be coated hung from the hanger conveyer is held so as to be coated from the side; or the object to be coated is disposed along the lower surface of the conveyer belt and the coating is applied upwardly from below. Furthermore, in the above-described embodiments, although the object to be coated comprises a short cut plate-like material with respect to the direction of the movement of the belt conveyer, the application of the present invention is not limited to this description. The present invention can be applied to a situation in which a coil of so-called roll sheet to which the continuous electrostatic coating is applied in the lengthwise direction thereof, effecting an excellent result.

According to the present invention, high speed electrostatic powder coating of a flat plate-like object to be coated can be performed, exhibiting an excellent edge covering performance and a uniform film thickness up to the cut edge of the surface. Since the products obtained using the device according to the present invention can be assembled while applying a bending of the material after application of the coating, the present invention has a significantly wide scope of utilization as a high performance means for manufacturing box-like products. The electrostatic powder coating device according to the present invention displays an excellent rate of use of the powder coating material, and the capability of color change in a short time. Therefore, the number of the maintenance staff for the device and the cost can be limited to the lowest level.

What is claimed is:

1. An electrostatic powder coating device comprising:
    an electroconductive belt conveyer for conveying an object to be coated and for adjusting an electric field of an end portion of said object to be coated;
    a cover for forming a space for coating above said belt conveyer;
    electrostatic powder coating guns pointed at said object to be coated in said space for coating;
    means for introducing air into said space for coating;
    means for exhausing air from said space for coating; and
    means for removing the powder coating material adhered to said belt conveyer.

2. An electrostatic powder coating device according to claim 1, wherein said electroconductive belt conveyer is grounded.

3. An electrostatic powder coating device according to claim 1, wherein a permeable material portion on the inner side of said cover serves as a ceiling portion of said cover.

4. An electrostatic powder coating device according to claim 1, wherein said means for removing said powder coating material adhered to said belt conveyer includes an AC corona ion shower type electrical charge erasing means.

5. An electrostatic powder coating device according to claim 1, wherein said electroconductive belt conveyer is grounded by an electric power source means for retaining a predetermined electric potential with respect to the ground.

6. An electrostatic powder coating device according to claim 5 wherein said electroconductive belt conveyer is permeable.

7. An electrostatic powder coating device according to claim 5 wherein at least the inner side of said cover is formed of an insulating material.

8. An electrostatic powder coating device according to claim 5 wherein said inner, side of said cover is formed of a semiconductor, and is grounded by an electric power source means for the purpose of retaining a predetermined electric potential with respect to the ground.

9. An electrostatic powder coating device according to claim 5 wherein said cover has a double layered structure, at least a part of the inner surface of said cover is made of a permeable material, and means is provided for introducing air through said permeable material into said space for coating.

10. An electrostatic powder coating device according to claim 1, wherein said electroconductive belt conveyer is permeable.

11. An electrostatic powder coating device according to claim 10 wherein at least the inner side of said cover is formed of an insulating material.

12. An electrostatic powder coating device according to claim 10 wherein said inner side of said cover is formed of a semiconductor, and is grounded by an electric power source means for the purpose of retaining a predetermined electric potential with respect to the ground.

13. An electrostatic powder coating device according to claim 10 wherein said cover is made as a double layered structure, at least a part of said inner surface of said cover being made of a permeable material, and means is provided for introducing air into said space for coating through said permeable material.

14. An electrostatic powder coating device according to claim 10 wherein said means for removing said powder coating material adhered to said belt conveyer includes an AC corona ion shower type electrical charge erasing means.

15. An electrostatic powder coating device according to claim 1, wherein at least the inner side of said cover is structured by an insulating material.

16. An electrostatic powder coating device according to claim 15 wherein a portion on said inner side of said cover is formed of a permeable material and serves as a ceiling portion of said cover.

17. An electrostatic powder coating device according to claim 1, wherein the inner side of the said cover is structured by a semiconductor, and is grounded via an electric power source device for the purpose of retaining a predetermined electric potential with respect to the ground.

18. An electrostatic powder coating device according to claim 17 wherein said cover is made as a double layered structure, at least a part of the surface of said inner side of said cover is made of a permeable material, and means is provided for introducing air into said space for coating through said permeable material.

19. An electrostatic powder coating device according to claim 1 wherein said cover has a double layered structure, at least a part of said inner surface of said cover is made of a permeable material, and means is provided for introducing air into said space for coating through said permeable material.

20. An electrostatic powder coating device according to claim 19 wherein said means for removing said powder coating material adhered to said belt conveyer includes an AC corona ion shower type electricity erasing means.

21. An electrostatic powder coating device according to claim 19 wherein said permeable material portion on said inner side of said cover serves as a ceiling portion of said cover.

22. An electrostatic powder coating device according to claim 21 wherein an inlet port of said means for exhausting air from said space for coating is disposed adjacent to said belt conveyer.

23. An electrostatic powder coating device according to claim 1, wherein an inlet port of said means for exhausting air from said space for coating is disposed adjacent to said belt conveyer.

24. An electrostatic powder coating device according to claim 23 wherein said means for removing said powder coating material adhered to said belt conveyer includes an AC corona ion shower type electrical charge erasing means.

* * * * *